United States Patent
Hackenschmied et al.

(10) Patent No.: US 7,626,173 B2
(45) Date of Patent: Dec. 1, 2009

(54) X-RAY DETECTOR AND DETECTOR MODULE

(75) Inventors: Peter Hackenschmied, Nuremberg (DE); Gottfried Tschöpa, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/806,163

(22) Filed: May 30, 2007

(65) Prior Publication Data
US 2007/0278412 A1 Dec. 6, 2007

(30) Foreign Application Priority Data
May 31, 2006 (DE) .................. 10 2006 025 764

(51) Int. Cl.
*G01T 1/00* (2006.01)
(52) U.S. Cl. ................................ 250/363.08
(58) Field of Classification Search ............. 250/363.08
See application file for complete search history.

(56) References Cited

U.S. PATENT DOCUMENTS

| 4,831,639 A | * | 5/1989 | Harke ..................... 378/19 |
| 4,866,743 A | * | 9/1989 | Kroener ..................... 378/4 |
| 6,362,480 B1 | * | 3/2002 | Peter et al. ................. 250/366 |
| 6,669,366 B2 | * | 12/2003 | Busse et al. ................ 378/199 |
| 6,925,142 B2 | | 8/2005 | Pohan et al. |
| 2005/0287008 A1 | | 12/2005 | Joshi et al. |
| 2006/0140345 A1 | * | 6/2006 | Canfield et al. ............. 378/199 |

FOREIGN PATENT DOCUMENTS

| DE | 101 35 288 U1 | 7/2001 |
| WO | WO 03046610 A1 | 6/2003 |

\* cited by examiner

*Primary Examiner*—David P Porta
*Assistant Examiner*—Shun Lee
(74) *Attorney, Agent, or Firm*—Harness, Dickey & Pierce, P.L.C.

(57) ABSTRACT

An X-ray detector is disclosed. In at least one embodiment, the X-ray detector includes a detector housing including a plurality of detector modules that extend into an interior space of the detector housing, the detector housing being designed to feed a coolant into the interior space. In order to cool the detector modules, in at least one embodiment the latter are respectively arranged on a hollow module carrier forming a cooling channel, it being possible for coolant to flow through the cooling channel during operation.

15 Claims, 2 Drawing Sheets

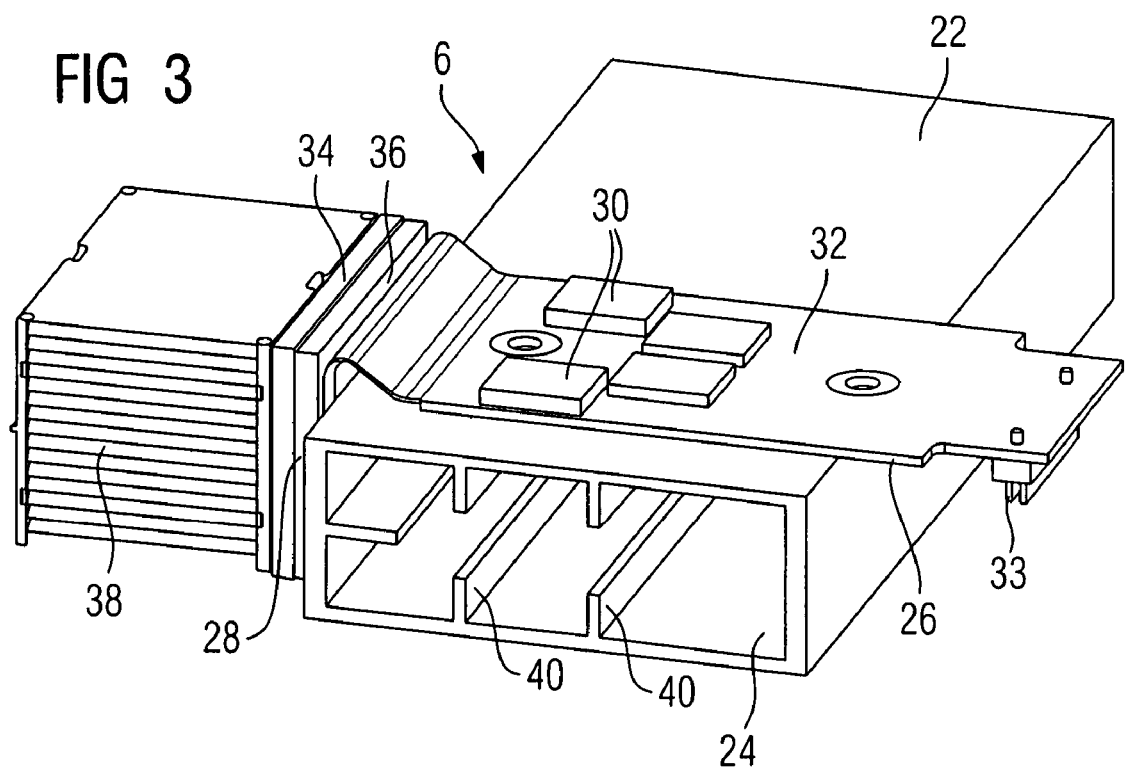

X-RAY DETECTOR AND DETECTOR MODULE

PRIORITY STATEMENT

The present application hereby claims priority under 35 U.S.C. §119 on German patent application number DE 10 2006 025 764.2 filed May 31, 2006, the entire contents of which is hereby incorporated herein by reference.

FIELD

Embodiments of the invention generally relate to an X-ray detector including a number of detector modules arranged in the interior space of a detector housing, the detector housing being designed to feed a coolant into the interior space. Embodiments of the invention further generally relates to a detector module for such an X-ray detector.

BACKGROUND

Such a detector is to be gathered, for example, from DE 101 35 288 U1, and is used in an X-ray computer tomograph. An X-ray detector usually includes a number of detector modules that are arranged in a housing in the manner of an array or a matrix. The detector modules are constructed from at least one detector element. Each detector element has on a front end a sensor element that detects the X-rays striking the detector element.

As a rule, the sensor element includes a converter that is excited by the γ quanta of the X-radiation, and a downstream signal transducer for measuring the signals generated by the converter. There is usually arranged upstream of the converter a collimator with the aid of which scattered radiation components are absorbed. The detector element further comprises readout electronics having a number of electronic components. The sensor element and the electronic components are arranged by way of example on a printed circuit board of the detector element.

The signals of the sensor element are evaluated and/or digitized in the electronic components. A not inconsiderable quantity of waste heat that must be dissipated is generated in the components of the detector module during operation. Malfunctioning of the electronic components, and thus of the detector module can come about in the event of intense heating or the accumulation of heat or else in the event of strong temperature fluctuations. Difficulties are caused in this case by the fact that both the electronic components and the transducer elements of the detector such as, for example, the converter and the signal transducer exhibit properties dependent on temperature and must be kept as still as possible in terms of temperature, since specific temperature changes lead to image artifacts.

SUMMARY

In at least one embodiment, the invention permits an effective cooling of the detector modules of an X-ray detector.

In at least one embodiment of the invention, an X-ray detector includes a number of detector modules arranged in the interior space of a detector housing, the detector housing being designed to feed a coolant into the interior space, and the detector modules respectively being arranged on a hollow module carrier forming a cooling channel, it being possible for coolant to flow through the cooling channel during operation.

At least one embodiment of the invention is based on the consideration that a particularly effective cooling of the detector modules of the X-ray detector is enabled in that the waste heat generated in the components of the detector modules is introduced into the module carrier, which makes thermally conductive contact with the components, because of a temperature difference.

The waste heat of the components that is diffused into the module carrier is thereby continuously exported by the coolant flowing in the cooling channel. A number of sub-channels can also be constructed in the interior of the module carrier. The module carrier thereby has both a supporting mechanical function, and the function of a heat dissipater and thus thermal buffer. The particular achievement of the cooling channel is that the coolant is scarcely applied to the components of the detector module or is not applied at all directly, and so the temperature level of the components remains stable during operation.

A particularly effective cooling occurs when the cooling channel is preferably provided on the inside with cooling ribs. This increases the contact area between the module carrier and the coolant, the result being that a larger quantity of heat is exported given the same coolant rate.

The module carrier is preferably constructed from a metal, in particular from aluminum. Metals have a very good thermal conductivity, and this renders them particularly suitable for use in the heat-dissipating module carrier.

In accordance with an example refinement, the detector module has at least one detector element with a printed circuit board that is fastened on the module carrier. The printed circuit board forms a platform on which the individual components of the detector element are fitted, and is formed, in particular, from a heat conducting material. It is therefore particularly advantageous for the printed circuit board, which makes direct contact with the components, to be fastened on the module carrier, the printed circuit board resting on the module carrier, particularly over a large area. This results in an intensive transfer of the heat produced in the detector element into the module carrier, via the printed circuit board.

In accordance with a further example refinement, the printed circuit board is L-shaped and rests on two adjoining sides of the module carrier. A sensor element of the detector element is arranged on one part of the printed circuit board, and electronic components for evaluating the signal from the sensor element are arranged on the second part, which is perpendicular to the first part. The great advantage in this refinement is that all the temperature-sensitive components of the detector element rest via the printed circuit board on one side of the module carrier, and can easily give up their waste heat to the module carrier.

In at least one embodiment, the detector modules are arranged in a row, and the module carrier extends transverse to the row. It follows that the cooling channel also extends in a transverse direction, and the coolant likewise flows in a direction transverse to the row. This has the advantage that there is an insignificant temperature gradient in the direction of flow, the result being to ensure a particularly uniform cooling of all the areas of the module carrier.

In accordance with an advantageous development, the detector housing has openings for the coolant along the detector modules. The openings are arranged, in particular, on a base plate and a cover plate of the detector housing such that a convective flow can be formed in a transverse direction. Moreover, the openings are distributed in such a way that all the detector modules are cooled approximately uniformly.

It is an advantage furthermore, that the openings are positioned in such a way that a closed cooling system is formed in the cooling channels. This dispenses with an additional cooling of the detector modules, for example by way of a coolant flow in the interior space of the detector module.

The cooling system in the cooling channels can, for example, be connected to a heat exchanger or to a gantry cooling system (where the X-ray detector is integrated in a gantry, for example of a computer tomograph), such that, for example, there is no need for fans for generating a flow in the channels. Ambient air, a gas and a liquid can be used as coolant. The cooling of the detector elements is performed exclusively indirectly by giving up the heat to the module carrier and exporting the heat from the module carrier by way of the coolant. It follows that the coolant is not applied directly to the temperature-sensitive components of the detector elements, and so temperature jumps in the coolant cannot directly affect the components.

In at least one embodiment, at least one fan is preferably provided on the detector housing for feeding air as coolant. So that the detector elements have more space in the detector housing, the fan or a number of fans is/are arranged, in particular, on an outer side of the base plate or cover plate. The fan or fans is/are positioned in the vicinity of the openings in such a way that ambient air is blown in or inducted through the openings, thus producing the flow in the channels of the module carriers.

According to at least one embodiment of the invention, a detector module for an X-ray detector includes at least one detector element, the detector module having a hollow module carrier that forms a channel and through which it is possible for a coolant to flow during operation of the X-ray detector, and on which the detector element is fastened.

The advantages set forth with regard to the X-ray detector, and example embodiments can be transferred mutatis mutandis to the detector module.

BRIEF DESCRIPTION OF THE DRAWINGS

An example embodiment of the invention is explained in more detail with the aid of the drawings, in which:

FIG. 3 shows a perspective illustration of a detector element fitted on a module carrier.

Identical reference numerals have identical meanings in the figures.

DETAILED DESCRIPTION OF THE EXAMPLE EMBODIMENTS

Figure 1:
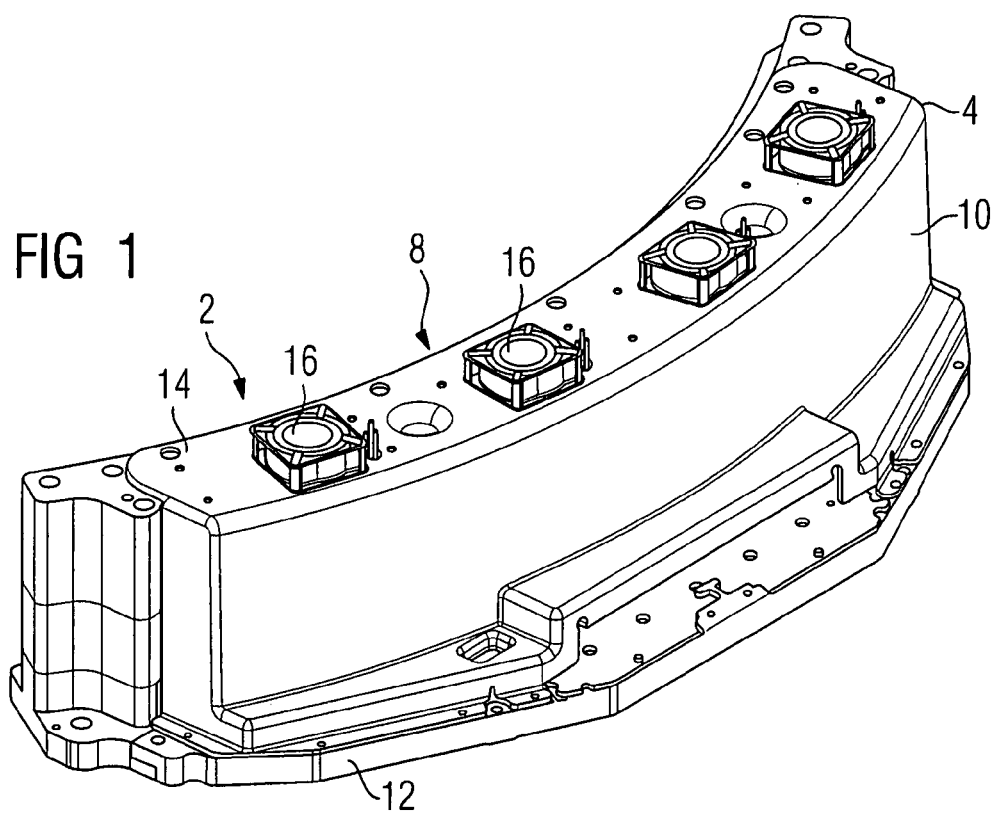
FIG. 1 shows a perspective illustration of an X-ray detector.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

FIG. 1 shows a digital X-ray detector 2 that is used, in particular, for imaging in a computer tomograph. The X-ray detector 2 has a detector housing 4 in which a multiplicity of detector modules 6 (compare FIGS. 2 and 3) are arranged. The X-ray detector 2 has an arcuate front detection side 8 on which the detector modules 6 are arranged in a row (compare FIG. 2). The detection side 8 is directed toward an X-ray source (not shown here), and X-rays strike it from the X-ray source. A rear side 10 of the detector housing 4 is arranged opposite. A base plate 12 and a cover plate 14 adjoin the detection side 8 and the rear side 10. Provided on the cover plate 14 are fans 16 that induct air as coolant in this exemplary embodiment, and thereby generate a coolant flow in the housing 4.

Figure 2:
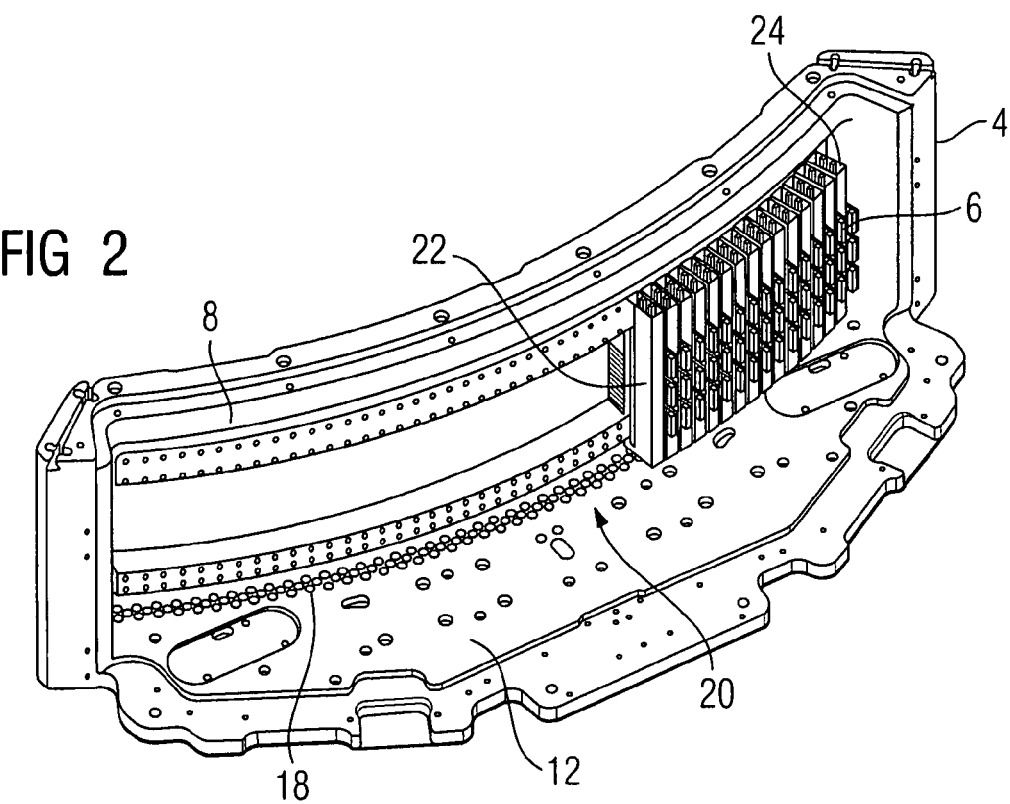
FIG. 2 shows a perspective illustration of the open X-ray detector in accordance with FIG. 1.

As may be seen from FIG. 2, an interior space 20 in which the detector modules 6 extend rearward is formed in the detector housing 4. Provided on the base plate 12 are openings 18 through which the cooling air flows into the housing 4. The openings 18 are arranged along the lined up detector modules 6 such that the cooling air flows directly into the housing 4 under the detector modules 6 and thereby cools the detector modules 6 effectively. Corresponding openings for the outflow of the cooling air from the housing 4 are provided on the cover plate 14 under the fans 16 (not shown).

The detector modules 6 are respectively arranged on a module carrier 22. The module carriers 22 are hollow and respectively form at least one cooling channel 24 in their interior. The module carriers 22 extend transverse to the row of detector modules 6 and are positioned directly over the openings 18 in the base plate 12 such that the cooling air flows only into the cooling channels 24. The result is the formation of a closed cooling system in which the cooling air flows exclusively through the cooling channels 24. In this example embodiment, the cooling air is inducted by the fans 16 positioned above the module carriers 22, and thereby conveyed outside the housing 4. The fans 16 produce a forced convective flow in the channels 24, further cooling air being continuously fed into the channels 24.

The fans 16 can alternatively be designed in such a way that they blow the cooling air into the housing 4 through the openings in the cover plate 14, and the cooling air then flows out of the channels 24 through the openings 18 in the base plate 12.

Since the channels 24 form a closed cooling system, and the coolant comes into contact only with the module carrier 22, it is possible, for example, to convey a compressed gas or a liquid through the cooling channels 24 with the aid of a compressor and/or a pump. Moreover, the detector cooling system can be connected to the cooling system of the computer tomograph.

The detailed design and functioning of a detector module 6 are to be gathered from FIG. 3. The figure shows a detector element 26 that includes a sensor element 28, electronic components 30 for evaluating the signal of the sensor element 28, and a printed circuit board 32 on which the sensor element 28 and the electronic components 30 are arranged.

The printed circuit board 32 is constructed, in particular, from a metallic material and has a good thermal conductivity. Provided at the end of the printed circuit board 32 is a plug 33 that serves to pass on the digitized measured values. The printed circuit board 32 is of L-shaped design. Consequently, in the mounted state of the detector module 6 the sensor element 28 arranged on one part of the printed circuit board 32 is directed toward the detection side 8, and the second part of the printed circuit board 32 with the electronic components 30 extends perpendicularly to the rear into the housing 4.

The sensor element 28 includes a converter 34 and a signal transducer 36 that detects the signals generated by the converter.

The detector element 26 has, moreover, a collimator 38 that is upstream of the sensor element 28. The collimator 38 includes a multiplicity of collimator plates that are oriented in a radial direction toward a focal point of the source of X-radiation.

The detector element 26 is mounted on the module carrier 22. Here, the L-shaped printed circuit board 32 rests with both its parts on two adjoining sides of the module carrier 22. The module carrier 22 is of wider design than the printed circuit board 32, space being provided in this example embodiment for two further detector elements 26 that supplement the detector module 6.

The waste heat generated in the electronic components 30 must be exported in order not to disturb the operation of the X-ray detector 2. Since the electronic components 30 are temperature sensitive, and the quality of the images produced by way of the X-ray detector 2 is impaired in the event of temperature jumps, the components 30 and the sensor element 28 are shielded from the coolant, which flows only in the channel 24, by the module carrier 22. Here, the components 28, 30 of the detector element 26 that are to be cooled are in contact with the module carrier 22 via the printed circuit board 32, and so their waste heat can diffuse into the module carrier 22.

The module carrier 22 is constructed from a heat-conducting metal, in this example embodiment from aluminum. The waste heat is thereby led from the area of the contact with the heated components 28, 30 further into the module carrier 22 and is distributed uniformly in it. Since the module carrier 22 is exposed inside to the cooling air flow, this heat is continuously exported. In order to achieve a larger quantity of exported heat without the need to increase the coolant rate, the channel 24 is provided with cooling ribs 40 that form a profiled surface of the inner side of the module carrier 22. This enlarges the contact area between the module carrier 22 and the coolant, the result being that more heat is exported per unit of time. The module carrier 22 cools down in this case, and is capable of absorbing further heat from the components 28, 30.

The module carrier 22 constitutes a thermal buffer that protects the components 28, 30 against direct contact with the coolant. By virtue of this indirect cooling, temperature jumps of the coolant are damped such that the functioning of the temperature-sensitive components 28, 30 is not impaired, and the image quality is maintained.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An X-ray detector, comprising:
   a detector housing, the detector housing being designed to feed a coolant into an interior space of the housing;
   a plurality of detector modules extending into the interior space of the detector housing; and
   a plurality of hollow module carriers arranged within the detector housing, each of the hollow module carriers including a cooling channel configured to flow a coolant through the hollow module carrier, the detector modules being arranged on a respective hollow module carrier.

2. The X-ray detector as claimed in claim 1, wherein each of the cooling channels is provided on the inside with cooling ribs.

3. A detector module for an X-ray detector as claimed in claim 2, wherein each of the detector modules includes at least one detector element, the at least one detector element being fastened on the respective hollow module carrier.

4. The X-ray detector as claimed in claim 1, wherein each of the hollow module carriers is constructed from a metal.

5. The X-ray detector as claimed in claim 4, wherein the metal is aluminum.

6. A detector module for an X-ray detector as claimed in claim 4, wherein each of the detector modules includes at least one detector element, the at least one detector element being fastened on the respective hollow module carrier.

7. A detector module for an X-ray detector as claimed in claim 4, wherein each of the detector modules includes at least one detector element with a printed circuit board, the at least one detector element with the printed circuit board being fastened on the respective hollow module carrier.

8. A detector module for an X-ray detector as claimed in claim 4, wherein each of the detector modules includes at least one detector element with a printed circuit board, the at least one detector element with the printed circuit board being fastened on the respective hollow module carrier and wherein the printed circuit board is L-shaped and rests on two adjoining sides of the respective hollow module carrier.

9. The X-ray detector as claimed in claim 1, wherein each of the detector modules includes at least one detector element with a printed circuit board fastened on a respective hollow module carrier.

10. The X-ray detector as claimed in claim 9, wherein the printed circuit board is L-shaped and rests on two adjoining sides of the respective hollow module carrier.

11. The X-ray detector as claimed in claim 1, wherein the detector modules are arranged in a row, and the respective module carrier extends transverse to the row.

12. The X-ray detector as claimed in claim 1, wherein the detector housing includes openings for the coolant along the detector modules.

13. The X-ray detector as claimed in claim 12, wherein the openings are positioned in such a way that a closed cooling system is formed in the cooling channels.

14. The X-ray detector as claimed in claim 1, wherein at least one fan is provided on the detector housing.

15. A detector module for an X-ray detector as claimed in claim 1, wherein each of the detector modules includes at least one detector element, the at least one detector element being fastened on the respective hollow module carrier.

* * * * *